(12) United States Patent
Bass et al.

(10) Patent No.: US 6,829,651 B1
(45) Date of Patent: Dec. 7, 2004

(54) LOCAL MAC ADDRESS LEARNING IN LAYER 2 FRAME FORWARDING

(75) Inventors: Brian Mitchell Bass, Apex, NC (US); Teresa Lynn Davis, Garner, NC (US); Anthony Matteo Gallo, Apex, NC (US); Michael Steven Siegel, Raleigh, NC (US); Fabrice Jean Verplanken, La Gaude (FR); Gail Irene Woodland, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,369

(22) Filed: Apr. 11, 2000

(51) Int. Cl.[7] ................................ G06F 13/00
(52) U.S. Cl. ................ 709/238; 709/249; 709/250
(58) Field of Search .............. 709/238, 249, 709/250, 207, 243, 244, 311, 251, 252, 253

(56) References Cited

U.S. PATENT DOCUMENTS

| | | | | |
|---|---|---|---|---|
| 4,825,206 A | * | 4/1989 | Brice, Jr. et al. | 340/825.02 |
| 5,790,545 A | * | 8/1998 | Holt et al. | 370/398 |
| 5,835,696 A | * | 11/1998 | Hess | 714/10 |
| 6,023,563 A | * | 2/2000 | Shani | 395/200.79 |
| 6,069,895 A | * | 5/2000 | Ayandeh | 370/399 |
| 6,243,394 B1 | * | 6/2001 | Deng | 370/466 |
| 6,331,985 B1 | * | 12/2001 | Coden | 370/403 |
| 6,445,709 B1 | * | 9/2002 | Chiang | 370/399 |
| 6,466,984 B1 | * | 10/2002 | Naveh et al. | 709/228 |
| 6,496,502 B1 | * | 12/2002 | Fite, Jr. et al. | 370/389 |
| 6,735,198 B1 | * | 5/2004 | Edsall et al. | 370/389 |

* cited by examiner

Primary Examiner—Viet D. Vu
(74) Attorney, Agent, or Firm—Connolly Bove Lodge & Hutz LLP (57) ABSTRACT

Method and apparatus for receiving a data frame on a received port of a network switch. The data frame includes a source media access control (MAC) address for the first device, and a destination MAC address for a second device connected to another port of the network. The data frame is forwarded to a target port which is connected to the second device. The MAC address is learned locally at the target port which facilities communications for frames which later enter the target port and contain addresses previously learned from a received frame.

21 Claims, 11 Drawing Sheets

LOCAL MAC ADDRESS LEARNING IN LAYER 2 FRAME FORWARDING

CROSS REFERENCE TO RELATED APPLICATIONS

This application is related by common inventorship and subject matter to co-pending application titled "Method for Bridging Control Point Data Frames Using a Network Processor", Ser. No. 09/546,981, filed Apr. 11, 2000. The listed application is assigned to International Business Machines Corporation and is entirely incorporated herein by this reference.

BACKGROUND OF THE INVENTION

The present invention relates to computer networks such as LANs (local area networks), and more particularly to a software-based method for reducing network bandwidth consumption and economizing on database space in MAC (media access control) address learning.

In networks, data is typically exchanged between communicating devices in the Form of "frames." Frames include a source MAC address and a destination MAC address; a MAC address uniquely identifies a network device in a "Layer 2" communication protocol used in Ethernet and Token Ring LANs.

A network switch connected between communicating devices uses the destination MAC address in an incoming frame generated by a source device to forward the frame to the appropriate target device. The switch typically includes a "control point" (CP) comprising a central processor and control software, and a plurality of forwarding processors. To facilitate forwarding, the CP and forwarding processors perform MAC address "learning."

MAC address learning refers to a process for reducing network traffic, wherein the source MAC address in a received frame is recorded in an address database along with its port of origin. This allows future frames destined for the source address to be forwarded only to the port on which that address is located. Otherwise, an unrecognized address must be "flooded out", i.e., forwarded to every port where the address may reside.

In existing systems, the CP maintains a central database of learned MAC addresses. A number of distributed MAC address databases which are duplicates of the central database are also maintained, locally to groups of ports and forwarding processors. As frames are received, a receiving forwarding processor performs look-ups of the source MAC addresses in the local databases, to determine whether they have been already learned. If not, the forwarding processor notifies the CP, and in response, the CP learns the source address (i.e., records it in the central database along with its port of origin), and adds the address to every local database.

In a variation of the above, the local databases are not duplicated, but the CP is still used to learn source MAC addresses whenever a forwarding processor cannot find the address in a local database.

In another variation, the CP is not used in learning; instead, if a forwarding processor cannot find a source address in a local database, it sends control messages to all other forwarding processors, directing them to add the source address to their respective local databases.

It may be appreciated from the foregoing description that existing methods of MAC address learning entail considerable bandwidth overhead, due to the need for notifying the CP each time an unknown source address is received and for subsequently downloading the address to every local database, or for sending control messages. Also, there is unnecessary duplication of MAC address databases at distributed local sites; most local sites (i.e., physically separate groups of ports and forwarding processors) only use a small proportion of the overall MAC addresses.

In view of the foregoing, a more efficient method of MAC address learning is needed.

SUMMARY OF THE INVENTION

According to the present invention, MAC address learning is performed locally rather than by a central processor. In a preferred embodiment, a MAC address database which is local to a destination or target port for a data frame is updated by a local forwarding processor with the source address and port of origin of the data frame. Similarly, the responding data frame is learned locally, in the MAC address database corresponding to the ingress port for the initial data frame. Once the addresses are learned locally, frame forwarding between the corresponding devices can be performed more efficiently.

Local as opposed to centralized learning includes the advantages of eliminating the unnecessary duplication of a central database at local sites. Space is also conserved because each local database contains only those addresses needed and used. Processing cycles are offloaded from the CP, which no longer needs to maintain a central database or download addresses to local databases. Bandwidth that would otherwise have been needed for centralized MAC address learning is available for frame forwarding.

Additionally, MAC address "aging" may be performed locally. Aging refers to a process of deleting infrequently-used addresses from a MAC database to save space. Local aging also offloads the CP.

A method of reporting the locally-learned, distributed MAC addresses databases in an aggregate form to network users or a network management application is also disclosed.

DETAILED DESCRIPTION OF THE INVENTION

Figure 1:
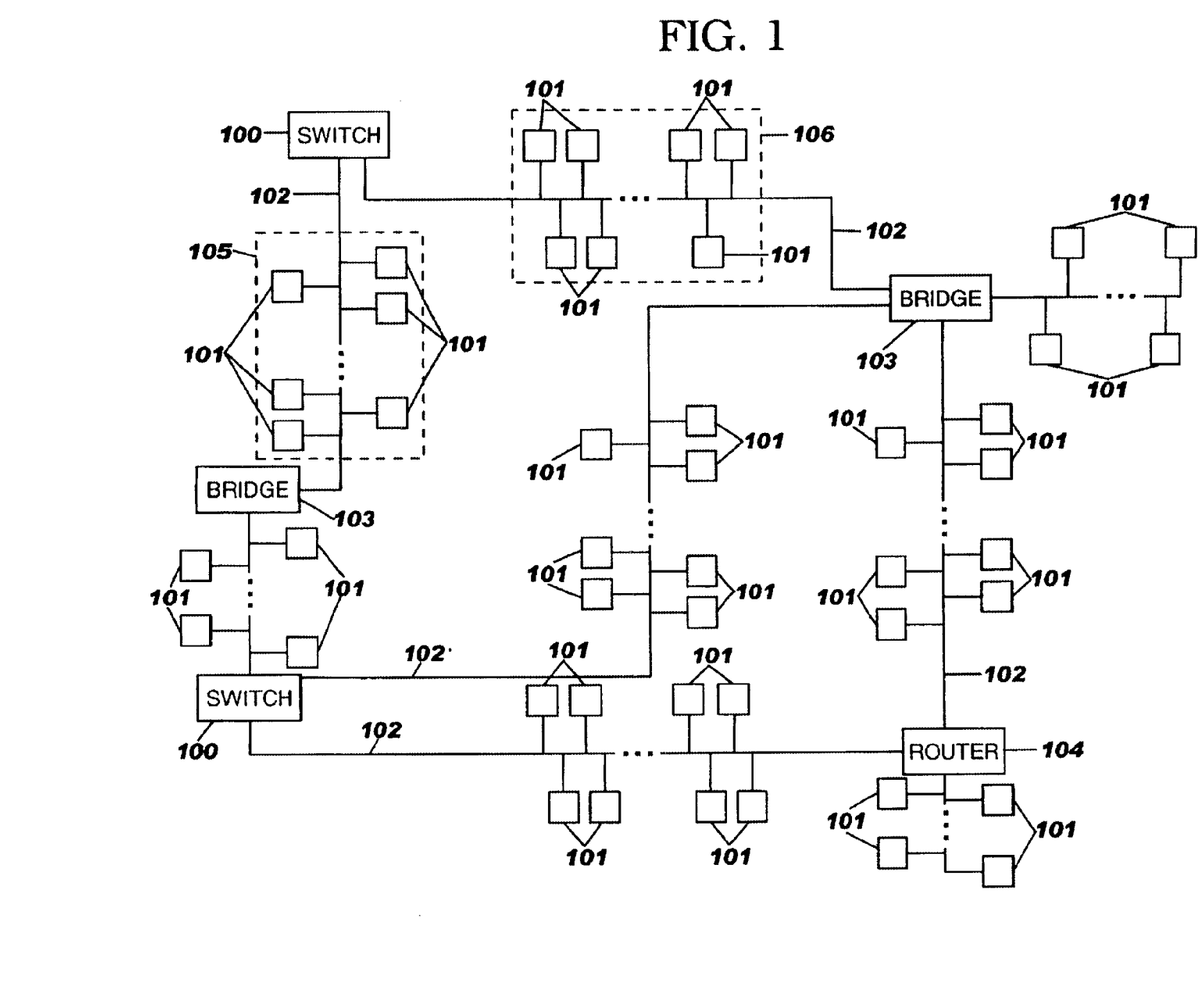
FIG. 1 shows an example of a communication network.

FIG. 1 shows an example of a typical network configuration in which the method of the present invention would find useful application. Network devices 101 such as personal computers, servers, terminals for data entry and display, printers and the like, are connected by a physical medium 102 such as twisted pair or coax cable to nodes such as bridges 103, switches 100, routers 104, and hubs/repeaters (not shown). Data generated by end users of the network devices travels across the network to other end users via the physical medium and the nodes, which perform the processing necessary to ensure the data arrives in a usable condition with the proper recipient.

For some applications, such as LANs, networks may be confined to a relatively small geographic area, such as a building or a campus. However, large numbers of smaller networks can be linked to form extensive composite networks including thousands of devices and nodes. As devices contend for a share of the network bandwidth, data collisions can result which degrade network performance. To reduce collisions, a network may be logically partitioned into "segments", for example segments 105 and 106, connected by nodes such as bridges, switches and routers.

In general, bridges and switches transfer data frames between segments, by filtering, flooding or forwarding the data frames. Filtering refers to dropping or discarding a received data frame when processing of the MAC addresses according to a set of rules. Flooding, as described above, refers to forwarding a data frame to all ports where a destination address may reside, when the address has not been learned and is thus unrecognized. Forwarding refers to sending an incoming data frame having a learned MAC address to the corresponding known port or ports.

As noted above, MAC addresses uniquely identify a network device in a Layer 2 communication protocol. The Layer 2 protocol may be viewed as occupying a level in a "protocol stack" of established, commonly-used communication standards, beginning with a Layer 1, representing the physical medium used to transfer data, followed by Layer 2, then by a Layer 3 and 4 and so on. Generally speaking, the layers above Layer 2 handle exchanges between network entities where the exchanges require more processing than at the lower levels.

Figure 2:
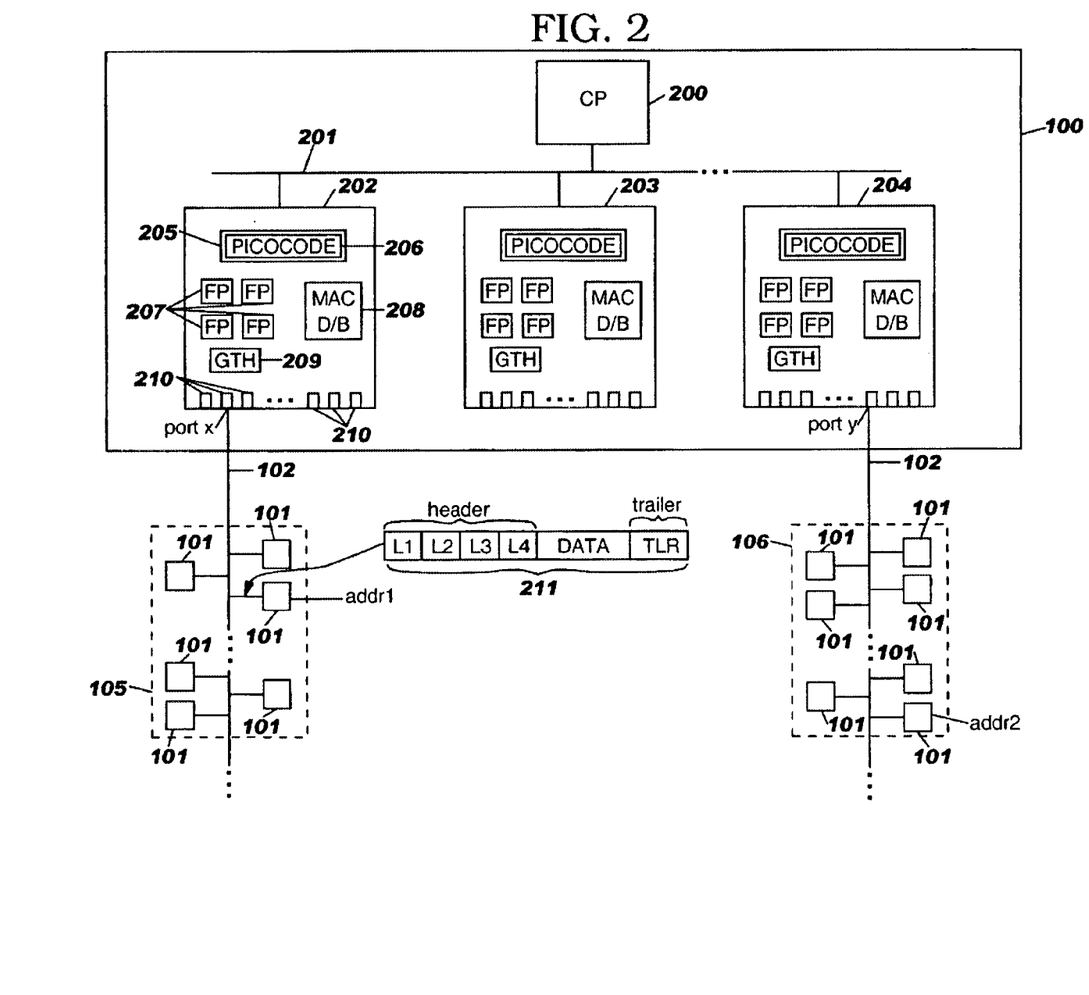
FIG. 2 shows components in a network switch.

FIG. 2 shows a switch 100 in greater detail. The switch includes a CP 200 and a plurality (not limited to three) of cards 202–204, connected to the CP 200 and to each other via a pipe 201 over which frames and control messages flow and which may be implemented as a DASL crossbar switch or a bus. Each card includes a local MAC database 208, a plurality (not limited to four) of forwarding processors 207, a specialized processor 209 known as a Guided Tree Handler (GTH), and a plurality of ports 210. Each card further includes a storage medium such as a ROM or RAM 205 for storing computer-executable instructions, referred to herein as "picocode" 206, which when executed by a forwarding processor and GTH, implement frame forwarding and MAC address learning. The GTH also executes the picocode to perform address aging and reporting functions detailed hereinafter.

The switch 100 is connected by a physical medium 102 between network segments 105 and 106. When a network device 101 needs to communicate with another device in a different network segment, data is transferred between the devices, via the physical medium, in frames such as frame 211. To enable the frame to arrive at the correct destination as it travels across the network, header information is added to the front of the frame in fields corresponding to the various protocols used (L1=Layer 1, L2=Layer 2, etc). The header information is followed by the actual user data and a trailer field.

Figure 3:
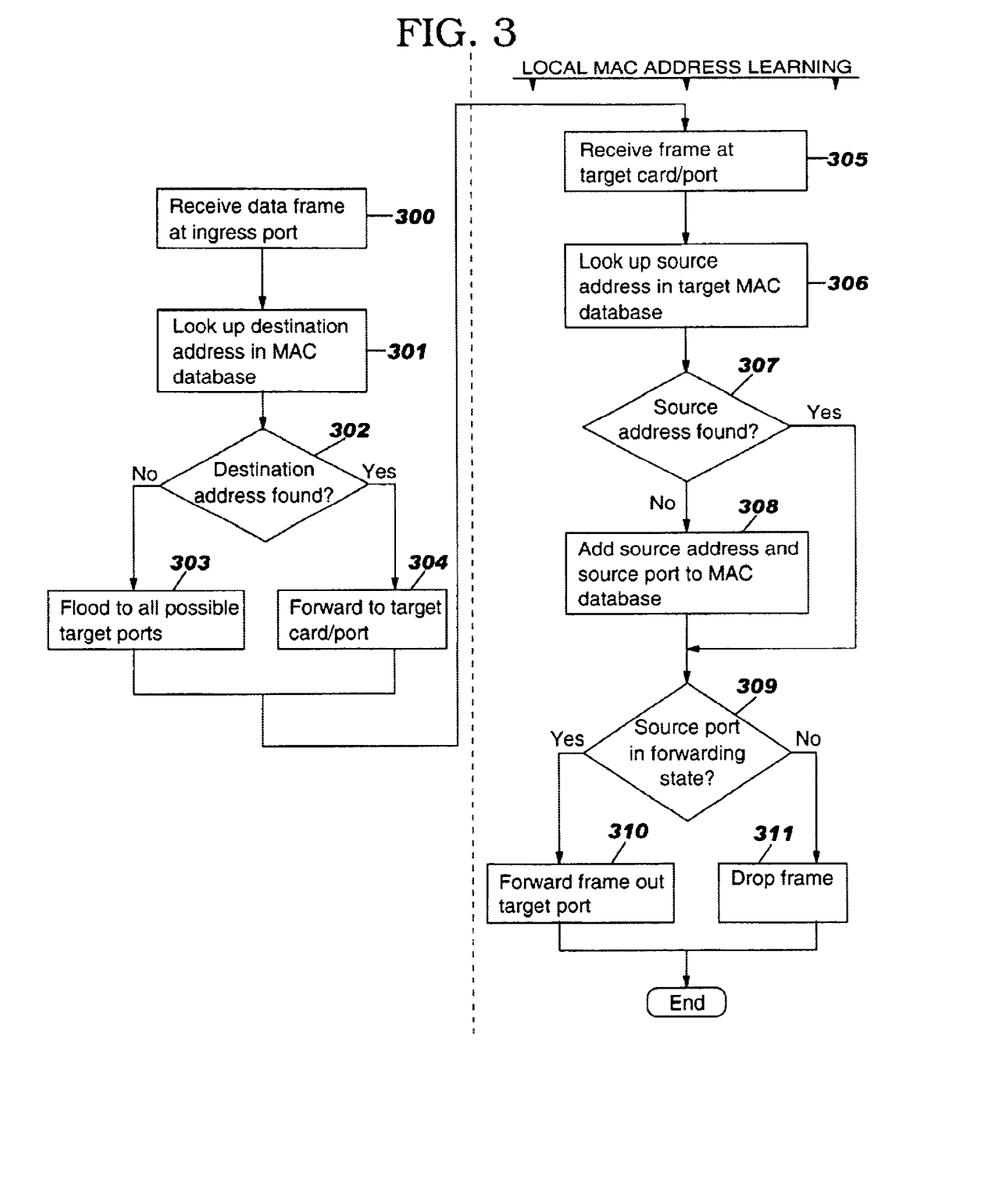
FIG. 3 shows a process flow in a method for local MAC address learning according to the present invention.

According to the present invention, when a frame 211 enters a receiving port 210, a forwarding processor 207 on the card executes picocode 206 causing the method illustrated in flowchart form in FIG. 3 to be implemented. Referring now to FIG. 3, the forwarding processor for the receiving port performs a look-up in the local MAC address database 208 for the destination address, as shown in blocks 300 and 301. As shown in blocks 302–304, if the address is found, the frame is forwarded via the connecting bus 201 to the card containing the target port or ports where the destination address is located. If not, the frame is flooded out to all possible target ports.

When a card containing a target port receives a frame forwarded to it from another card on the switch (block 305), local MAC address learning at the destination (i.e., learning on the target card) according to the present invention is performed as shown in blocks 305–312. As shown in blocks 306 and 307, a local processor 207 performs a look-up in the local MAC address database 208 for the source address. If the source address is not found, the processor notifies the GTH 209 that there is a new address to be learned, or, if the port of origin of the source address has changed, the processor notifies the GTH 209 that the address information must be updated.

As noted above, the GTH is a specialized processor for accessing and maintaining the local MAC address database. More specifically, MAC addresses may be stored in a database structure known as a "Patricia tree" which enables fast searching and access. The tree entries are also chained together in a singly-linked circular list. While any processor may perform a search of the MAC address database, the GTH is used to add, delete or update database entries, or perform any actions which require following the entry chain. (The GTH and the local processor can communicate without using any of the bandwidth used for forwarding frames.) Upon being notified by a local processor as described above, the GTH records the source MAC address of the forwarded frame in the local database, along with its port of origin, as shown in block 308.

Decision block 309 may be executed in order to accommodate the widely-used "Spanning Tree" function which is defined in the 802.1D communication standard. The Spanning Tree standard was developed to prevent network loops and is well-known in the art. In Spanning Tree, there are five basic port states: disabled, blocking, listening, learning and forwarding. Frames may be forwarded only when both the source and target ports are in the forwarding state. Accordingly, depending on whether the source port is in the forwarding state or not, the frame is either dropped (block 311), or forwarded out the target port and sent via the physical medium to the target network device (block 310).

Figure 4A:
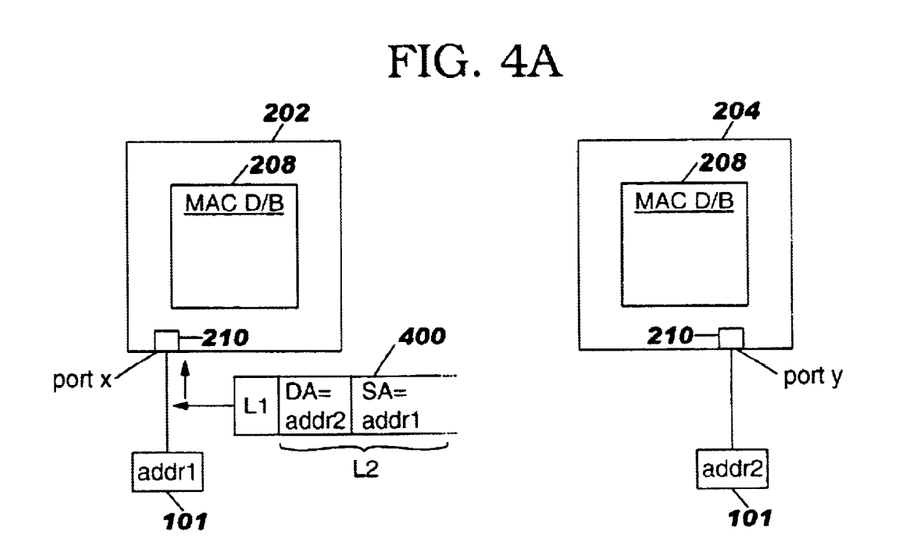
FIGS. 4A-4E illustrate the application of the method shown in FIG. 3 in a specific example.

FIGS. 4A-4E illustrate an example of the application of the method shown in FIG. 3. In FIG. 4A, a network device 101 having MAC address "addr1" generates a frame 400 having a Layer 2 field including a destination address (DA) of "addr2"; the source address (SA) is addr1. The frame is received by a port 210 (specifically, port x) on a card 202 including a local MAC database 208.

Figure 4B:
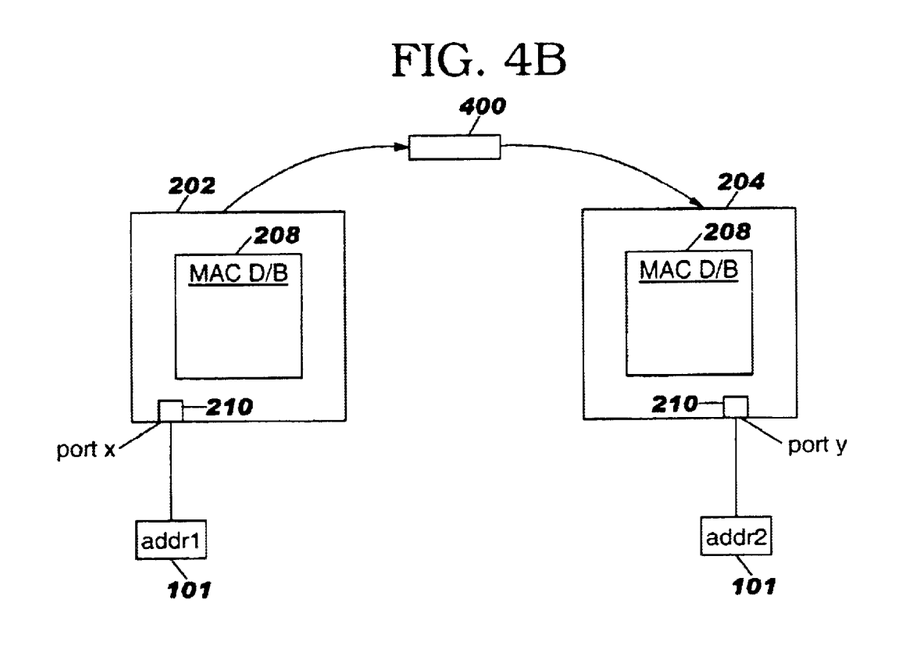

Since the local MAC database does not contain the destination address, the frame is flooded, and a copy is sent to the card 204 having the port (specifically, port y) connected to the target device, addr2, as shown in FIG. 4B.

Figure 4C:
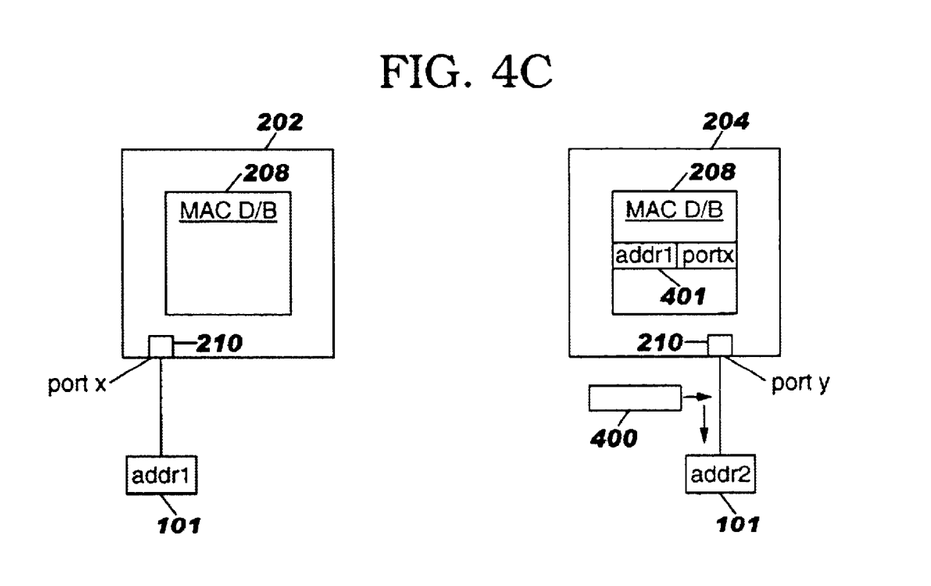

As shown in FIG. 4C, the source address is not present in the local MAC database on card 204, so the source address and port of origin are added to the database as entry 401, and the frame is forwarded out port y to addr2. (It is noted that the representation of entries in a MAC database 208 has been simplified in the Figures for purposes of illustration.)

Figure 4D:
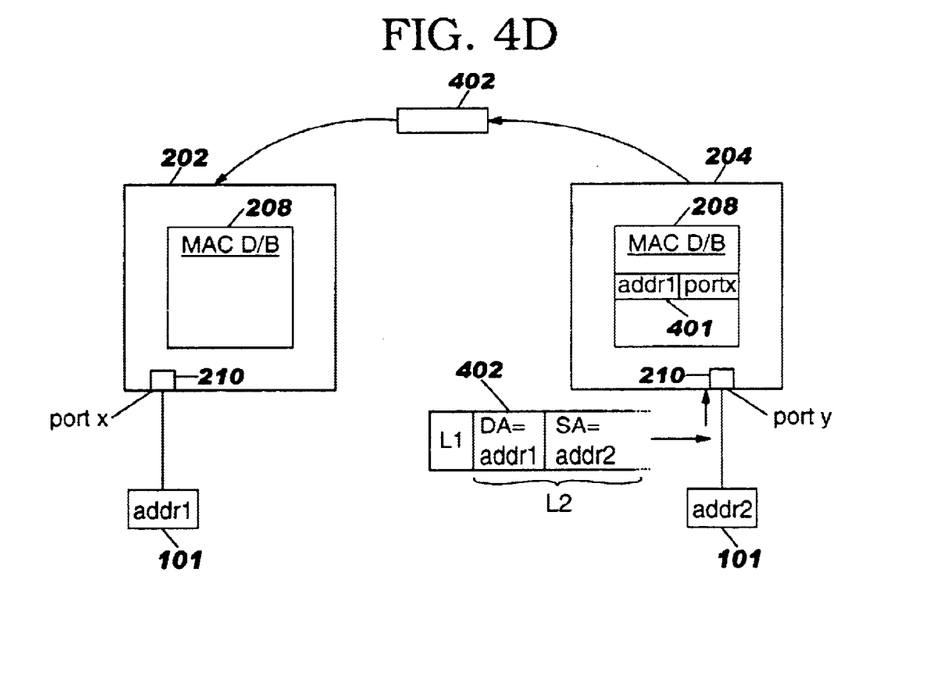

As shown in FIG. 4D, typically the target device sends a frame in response. In the responding frame 402, the MAC addresses are reversed. What was formerly the source address is now the destination address, and what was formerly the destination address is now the source address. Similarly, the roles of the receiving and target ports are now reversed. Accordingly, when a local processor for the receiving port (port y) looks up the destination address for the responding frame, the local MAC database of the receiving port contains the destination address (addr1) and target port (port x), since it was just added by the process described above. The responding frame may thus be forwarded directly to the target port.

Figure 4E:
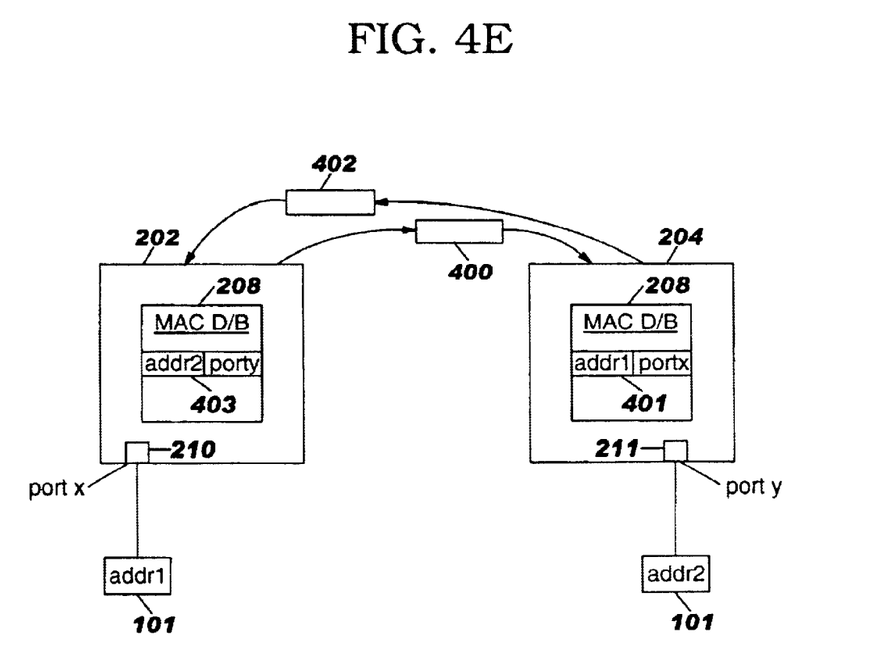

As shown in FIG. 4E, when the card containing the target port for the responding frame receives the forwarded frame, it performs the method shown in FIG. 3, learning the source address (addr2) and port of origin (port y) as described above, as shown in entry 403. Thus, subsequent exchanges between the network devices corresponding to addr1 and addr2 may be performed more efficiently, since the addresses have been learned at the corresponding local sites on the switch.

In view of the foregoing, the advantages of learning MAC addresses locally at a target port, as opposed to using a CP, are evident. Unnecessary duplication of databases is avoided, since each local database contains only those addresses needed and used. Further, bandwidth that would otherwise have been needed for MAC address learning using a CP is available for frame forwarding.

An additional benefit of local MAC address learning is realized in an "aging" process which occurs for MAC addresses. Because, as noted above, networks can be very extensive, MAC address databases can become very large. Accordingly, in the aging process, database entries corresponding to addresses which have not been accessed for a pre-determined period of time are purged in order to free up space.

Figure 5:
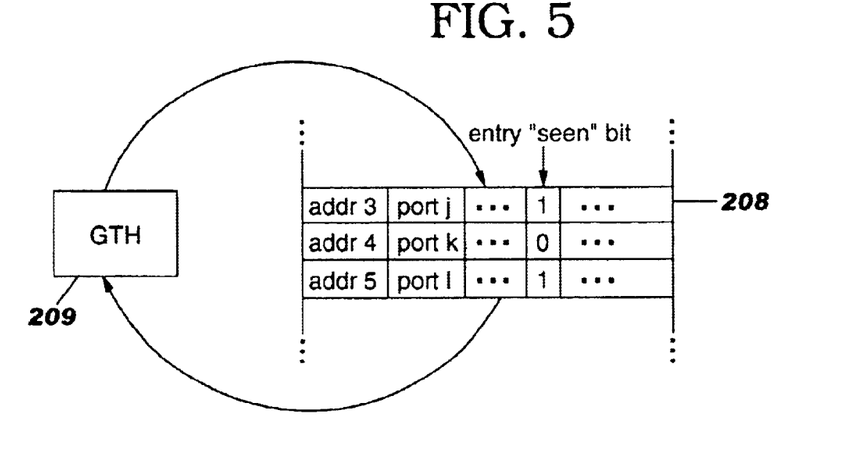
FIG. 5 shows entries in a MAC database being traversed for database aging.

According to the present invention, aging is performed locally. As shown in FIG. 5, the switch hardware records an access to an address when a look-up of a source MAC address is performed on a MAC database 208 and an entry is found, by setting an "entry seen" bit in the entry. An aging task resets the seen bit periodically. An entry is considered to be expired if the entry seen bit has not been set since the last time the entry was visited by the aging task Each GTH traverses the local database to delete expired entries.

Figure 6:
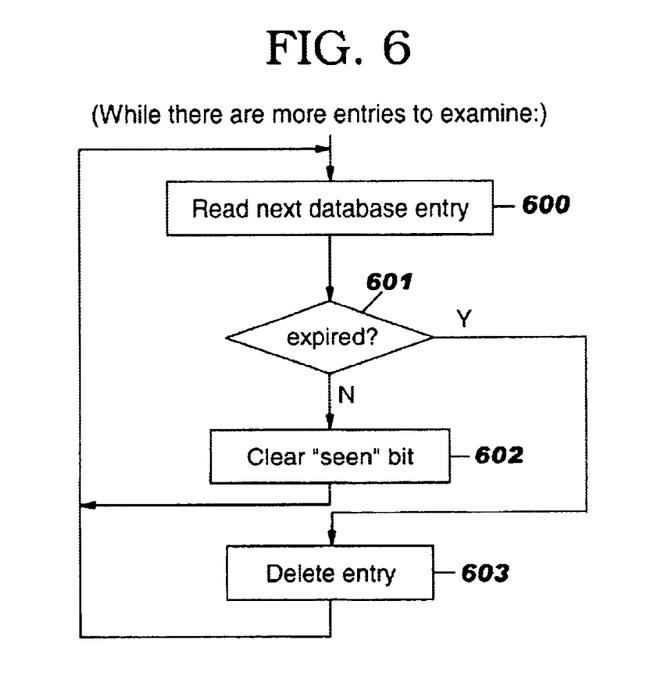
FIG. 6 shows a process flow in aging.

A process flow for aging is illustrated in FIG. 6. The MAC database entries are circularly linked in the order they are learned. Because MAC address databases can be extremely large, the GTH traverses only a portion of the database in a single time interval, beginning with the entry following the last one it examined during the previous time interval. Each GTH has a timer which "pops" (generates a signal) when a defined timer value expires. Because the number of entries fluctuates, the aging task computes a number of entries which it must examine between timer pops in order completely traverse the database within a user-defined period.

As shown in blocks 600–603, if an access has not been recorded for the entry since the last time the entry was examined, the GTH deletes the entry. If an access has been recorded, the GTH clears the record of the access (resets the entry seen bit).

It can be seen that the foregoing process of local aging saves the bandwidth of CP communication that would be utilized in aging performed by the CP, and offloads considerable processing from the CP.

The advantage of local aging is even more evident in "accelerated" aging. Accelerated aging is performed in response to a "Topology Change Notification", indicating a re-configuration of the network, received by the Spanning Tree protocol running on the CP. Accelerated aging requires that at the exit of the accelerated aging period, the only addresses left in the MAC address databases are those that were accessed during the accelerated aging period.

According to the present invention, at the beginning of accelerated aging period, the GTH traverses the entire local database and eliminates the records of any accesses. At the end of the accelerated aging period, the GTH deletes any entry which does not have a record of an access during the accelerated aging period.

Topology change notifications are common events which can result in purging of entire databases, causing extreme stress to switches that perform aging from the CP. Thus, it can be seen that performing aging locally significantly relieves the CP.

The present invention further provides a method of controllably reporting on the status of the local MAC address databases to users, if desired. The method compiles the distributed MAC databases into an aggregate database, which may be the required form for reporting to network management applications on the switch. It may also be used for console display for viewing by humans.

Figure 7A:
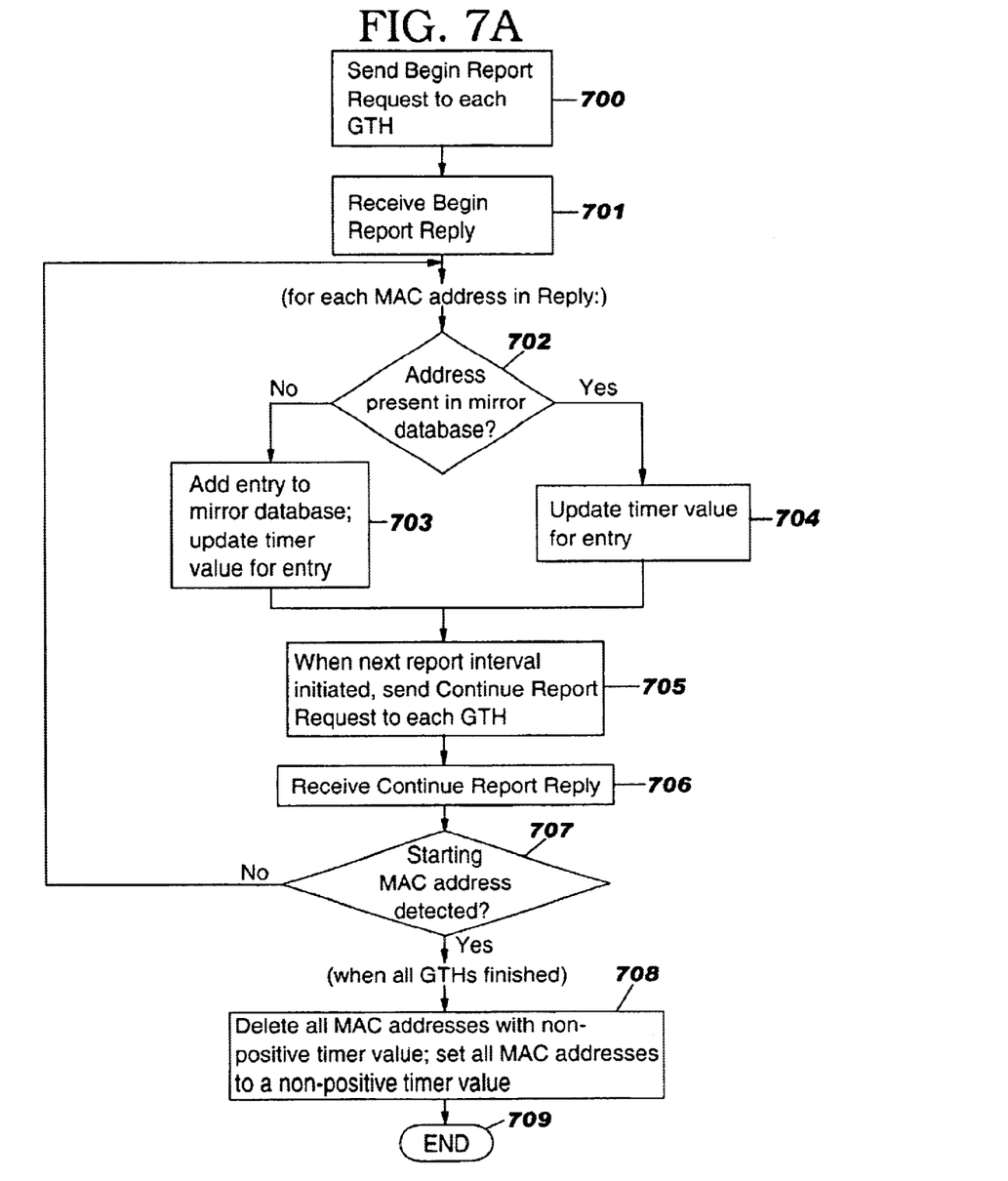
FIGS. 7A and 7B show a process flow in a method for user-controlled MAC address reporting.
Figure 7B:
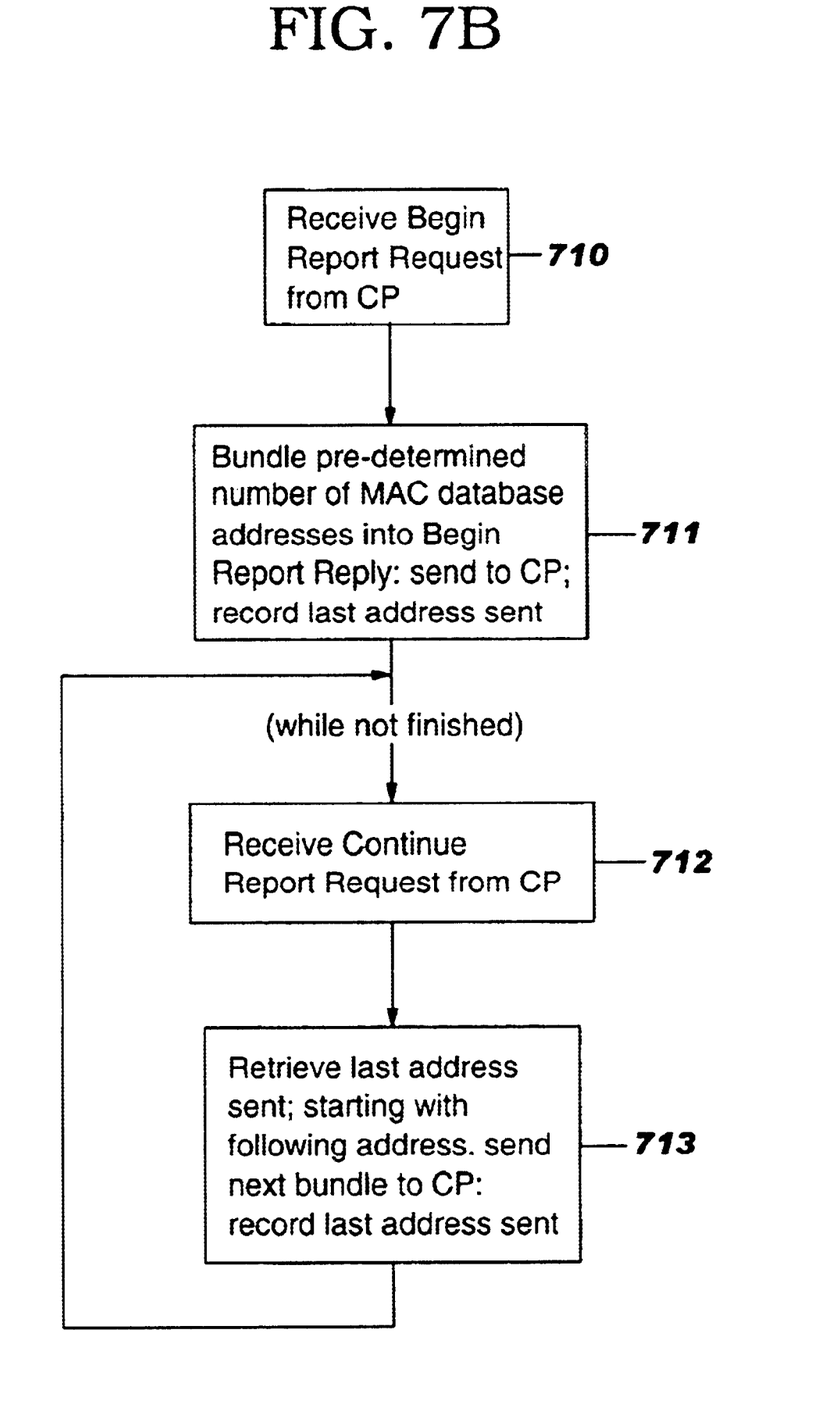

To provide for address reporting as needed, computer-executable instructions according to the present invention perform a "mirroring" method. FIGS. 7A and 7B show a process flow for the method, with FIG. 7A showing steps executed by the CP, and FIG. 7B showing steps executed by a GTH.

If an optional mirroring function is enabled, the CP will start a report timer having a timer value configurable by a user. After a period of time defined by the timer value elapses, the CP will send a Begin Report Request to each GTH, as shown in block 700. As shown in blocks 710 and 711 of FIG. 7B, upon receipt of the request, each GTH bundles a pre-defined number of MAC addresses into a Begin Report Reply and sends the bundle to the CP, recording the last address sent (this address cannot be deleted while it is recorded as the last address). To locate a starting address for the Begin Report Reply, a GTH will perform a search on a default MAC address which is always present in the database, for instance, the BPDU address (the BPDU address is defined by the 802.1D standard and is used by the Spanning Tree algorithm). This address acts as a logical beginning of a chain of MAC addresses stored in the database.

As shown in blocks 701–704 in FIG. 7A, when the CP receives the Begin Report Reply, it will add each MAC address into a mirror database if the address is not already in the database. Each MAC address in the mirror database has a timer value associated with it. When an address is first entered, the value is positive. Every time the MAC address is reported again the timer value will be reset to the positive value.

After a subsequent period determined by the report timer, the CP will send a Continue Report Request to each GTH (block 705). As shown in blocks 712 and 713, when a GTH receives this request, it obtains the MAC address chained after the last MAC address it reported, bundles that address and a pre-determined number of the addresses following it into a Continue Report Reply which it sends to the CP. The GTH records the lest address sent.

As shown in blocks 706 and 707, as the CP receives the Continue Report Replies from the GTHs, it continues adding MAC addresses to its mirror database, updating the timer value for each entry. It also checks for the appearance of the starting MAC address received in response to the Begin Report Request. When this address appears, it is an indication that the entire circularly-linked database has been traversed. The CP suspends sending Continue Report Requests to those GTHs which have traversed their entire databases, and continues sending the Continue Report Requests to those GTHs which have not yet finished their traversals.

As shown in block 708, when all of the GTHs have completed their database traversals, the CP traverses the mirror database and deletes all those entries which do not have a positive timer value (on the first traversal there will not be any addresses deleted, since all will have a positive timer value). At the same time the CP will set the timer value on all MAC addresses in the mirror database to a non-positive value. The foregoing steps allow the CP to clean out MAC addresses which are no longer active in the local databases.

After a pre-determined period, the CP will begin the report cycle again, by sending a Begin Report Request to the GTHs.

Figure 8A:
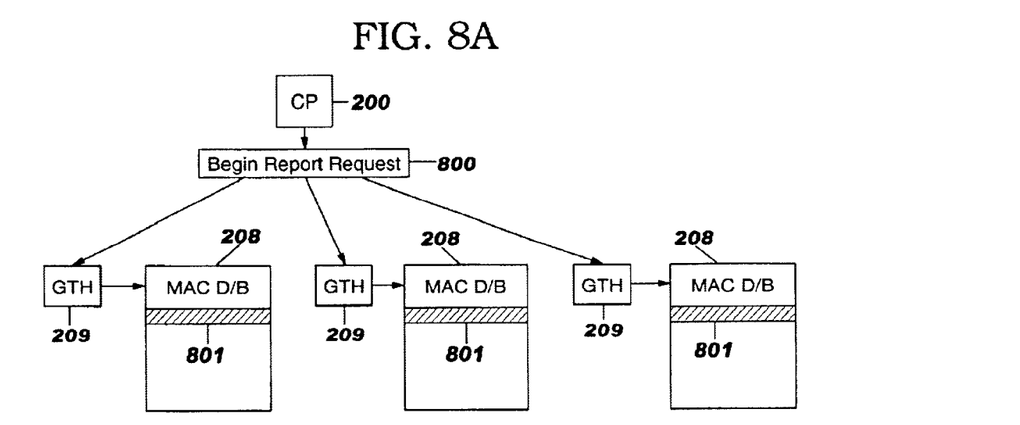
FIGS. 8A and 8B further illustrate MAC address reporting.
Figure 8B:
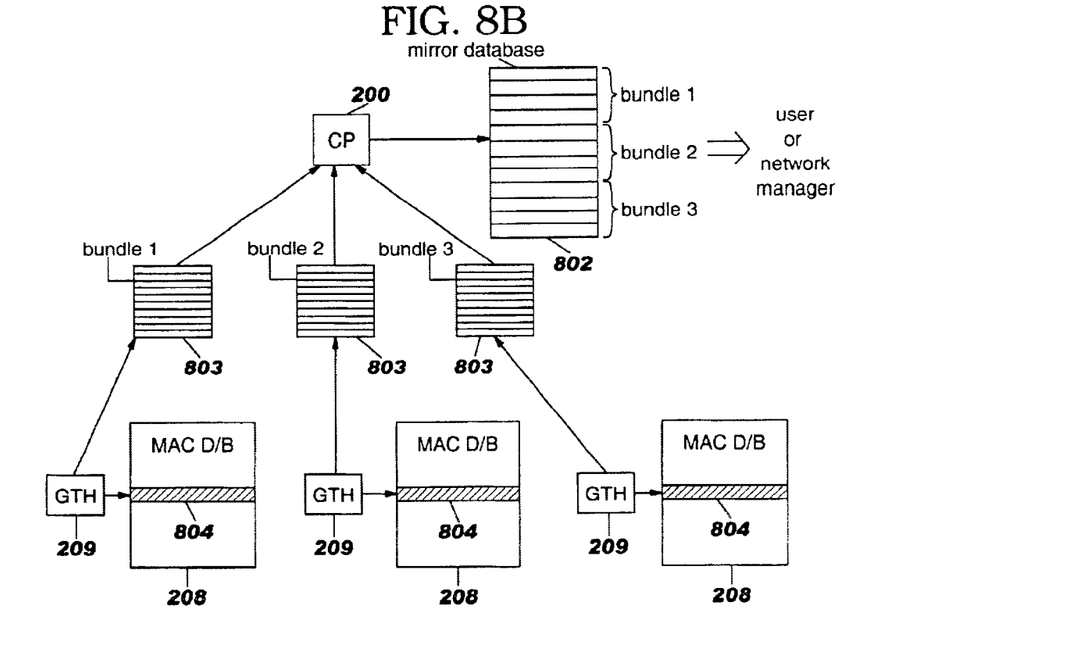

FIGS. 8A and 8B are another illustration of MAC address reporting according to the present invention. As shown in FIG. 8A, in response to a Begin Report Request 800 issued by the CP 200, GTHs 209 (not limited to three) locate a default address 801 in their respective MAC databases 208. Beginning at the default address, the GTHs form bundles 803 of a pre-determined number of MAC addresses and send them to the CP, recording a last address sent 804. The CP compiles an aggregate mirror database 802 from the bundles, which may be reported out to a user on a display screen, for example, or reported to a network manager.

As noted above, the mirroring function is optional and configurable by a user. A user can set the reporting time interval in accordance with the level of traffic on the switch so as to achieve a tolerable level of reporting interference.

Figure 9:
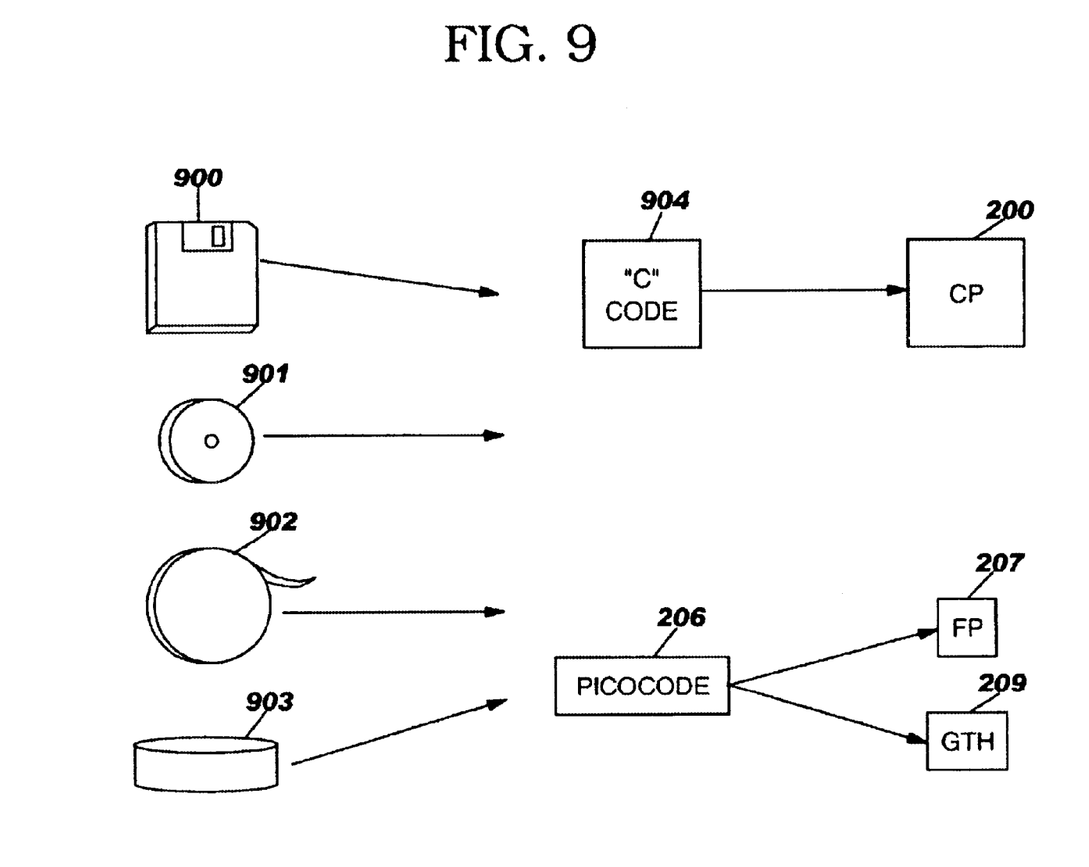
FIG. 9 shows examples of computer-usable media which may be used to store computer-executable instructions according to the present invention.

FIG. 9 illustrates examples of computer-executable media such as diskette 900, CD-ROM 901, magnetic tape 902 or hard disk 903 which may be used to store and transport computer-executable instructions according to the present invention. As is well understood, the instructions may be retrieved from the storage media and executed by a processor to effect the method of the invention. Typically, a forwarding processor 207 or GTH 209 executes the picocode 206. The CP 200 typically executes a high-level language such as "C" code 904.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method comprising:
    receiving a data frame on a receive port from a first device connected to a network, said data frame including a source media access control (MAC) address for said first device and a destination MAC address for a second device connected to said network;
    determining from said address the location of a target port corresponding to said second device;
    forwarding said data frame to a target port corresponding to said second device; and
    learning said source MAC address locally to said target port when said data frame is received at said target port.

2. The method of claim 1, said learning step comprising:
    determining whether said source MAC address is present in a database local to said target port; and
    recording said source MAC address along with a port connected to said first device in said local database if not present.

3. The method of claim 1, further comprising performing frame forwarding using said locally-learned MAC address.

4. The method of claim 2, further comprising aging said MAC address locally.

5. The method of claim 2, further comprising:
    bundling a pre-determined number of said MAC addresses into a reply in response to a report request from a control point; and
    transmitting said reply to said control point.

6. The method of claim 5, further comprising:
    compiling a plurality of said replies into an aggregate database; and
    reporting said aggregate database to a network user or manager.

7. The method of claim 5, wherein said report request is issued at time intervals which are configurable by a network user.

8. A network switch comprising:
    a target port connected to a destination network device;
    processors and a MAC address database local to said target port;
    an ingress port having a local processor which identifies from a destination address contained in said frame a target port, and forwards said frame to said target port;
    said processors programmed to perform MAC address learning locally to said target port source addresses and source ports contained in a frame received from said ingress port.

9. A network switch comprising:
    a target port connected to a network device;
    processors and a MAC address database local to said target port;
    an ingress port having a local processor which forwards a frame received on said ingress port to said target port identified by said destination address;
    said processors programmed to perform MAC address learning locally to said target port of source addresses and source ports contained in frames received by said ingress port.

10. The network switch of claim 8, said processors programmed to perform frame forwarding using said local MAC address database.

11. The network switch of claim 8, said processors programmed to perform aging of said local MAC address database.

12. The network switch of claim 8, a database-handling processor of said processors programmed to bundle a pre-determined number of said MAC addresses into a reply in response to a report request from a control point included on said switch, and transmit said reply to said control point.

13. The network switch of claim 12, said control point compiling a plurality of said replies into an aggregate database and reporting said aggregate database to a network user or manager.

14. A computer-usable medium storing computer-executable instruction, said instructions when executed by a processor implementing a method comprising:

receiving a data frame on a receive port from a first device connected to a network, said data frame including a source media access control (MAC) address for said first device and a destination MAC address for a second device connected to said network;

forwarding said data frame to a target port identified by said destination address corresponding to said second device; and learning said source MAC address locally to said target port when said frame is received at said target port.

15. The computer-usable medium of claim 14, said learning step comprising:

determining whether said source MAC address is present in a database local to said target port; and recording said source MAC address in said local database if not present.

16. The computer-usable medium on claim 14, said method further comprising performing frame forwarding using said locally-learned MAC address.

17. The computer-usable medium of claim 14, said method further comprising aging said MAC address locally.

18. The computer-usable medium of claim 14, said method further comprising:

bundling a pre-determined number of said MAC addresses into a reply in response to a report request from a control point; and transmitting said reply to said control point.

19. The computer-usable medium of claim 18, said method further comprising:

compiling a plurality of said replies into an aggregate database; and reporting said aggregate database to a network user or manger.

20. The computer-usable medium of claim 18, wherein said report request is issued at time intervals which are configurable by a network user.

21. The network switch of claim 8, wherein said ingress port local processor floods a plurality of ports of said switch with said frame when said local processor cannot determine a target port from said destination address.

* * * * *